United States Patent [19]
Arbore et al.

[11] Patent Number: 5,815,307
[45] Date of Patent: Sep. 29, 1998

[54] APERIODIC QUASI-PHASEMATCHING GRATINGS FOR CHIRP ADJUSTMENTS AND FREQUENCY CONVERSION OF ULTRA-SHORT PULSES

[75] Inventors: Mark A. Arbore, Palo Alto; Martin M. Fejer, Menlo Park, both of Calif.

[73] Assignee: The Board of Trustees of the Leland Stanford Junior University, Stanford, Calif.

[21] Appl. No.: 824,032

[22] Filed: Mar. 26, 1997

[51] Int. Cl.⁶ .................................. G02F 1/37; G02B 5/18
[52] U.S. Cl. .................... 359/328; 359/326; 359/573; 359/575; 385/37; 385/122
[58] Field of Search ............................. 359/326–332, 359/130, 154, 173, 569, 571, 573, 575; 385/10, 15, 37, 122

[56] References Cited

U.S. PATENT DOCUMENTS

| | | | |
|---|---|---|---|
| 4,655,547 | 4/1987 | Heritage et al. | 359/563 |
| 4,928,316 | 5/1990 | Heritage et al. | 359/154 |
| 4,961,195 | 10/1990 | Skupsky et al. | 372/31 |
| 5,317,666 | 5/1994 | Agostinelli et al. | 385/122 |
| 5,387,998 | 2/1995 | Kitaoka et al. | 359/328 |
| 5,436,758 | 7/1995 | Agostinelli et al. | 359/332 |
| 5,519,802 | 5/1996 | Field et al. | 385/129 |
| 5,581,642 | 12/1996 | Deacon et al. | 385/15 |

OTHER PUBLICATIONS

Giordmaine, J. et al., *Compression of optical pulses,* IEEE Jour. Quan. Elec., vol. QE–4, No. 5, pp. 252–255, 1968 (May).

Strickland, D., *Compression of amplified chirped optical pulses,* Optics Comm., vol. 56, No. 3, pp. 219–221, 1985 (Dec.).

Treacy, E., *Optical Pulse compression with diffraction gratings,* Ieee Journ. Quan. Elec., vol. QE–5, No. 9, pp. 454–458, 1969 (Sep.).

Duarte, F. et al., *Dispersion theory of multiple prism beam expanders for pulsed dye lasers,* Optics Comm., vol. 43, No. 5, pp. 303–307, (Nov.).

Martinez, O., *3000 times grating compressor with positive group velocity dispersion: application to fiber compensation 1.3–1.6 μm region,* IEEE Jour. Quant. Elec., QE–23(1), pp. 59–64, 1987 (Jan.).

Mollenauer, L. et al., *Extreme picosecond narrowing by means of solition effect in single mode optical fibers,* Opt. Lett., 8(5), pp. 289–291, 1983 (May).

Suhara, T. et al., *Theoretical analysis of waveguide second harmonic generation phase matched with uniform and chirped ratings,* IEEE Jour. Quan. Elec., 26(7), pp. 1265–1276, 1990 (Jul.).

(List continued on next page.)

*Primary Examiner*—John D. Lee
*Attorney, Agent, or Firm*—Lumen Intellectual Property Services

[57] ABSTRACT

An apparatus and method for simultaneous chirp adjustment and frequency conversion of an ultra-short input optical pulse $A_1$ characterized by a center angular frequency $\omega_{1,0}$ in a non-linear optical material with a quasi-phasematching (QPM) grating exhibiting an aperiodic pattern of regions $D_j$ constituting a grating. Passing the ultra-short input optical pulse $A_1$ through the grating gives rise to a chirp-adjusted and frequency-converted output optical pulse $A_2$. In the preferred embodiment the non-linear optical material is a Second Harmonic Generator (SHG) such that the output optical pulse $A_2$ generated from the input optical pulse $A_1$ is a chirp-adjusted second harmonic of said ultra-short input optical pulse $A_1$. In the general case the method and apparatus use a transfer function $\hat{D}(\Omega)$ derived from the equation:

$$\hat{A}_2(\Omega) = \hat{D}(\Omega) \cdot \widehat{A_1^2}(\Omega),$$

where $\widehat{A_1^2}(\Omega)$ is the Fourier transform of the square of input optical pulse $A_1$ and $\hat{A}_2(\Omega)$ is the Fourier transform of output optical pulse $A_2$, to engineer gratings for frequency-conversion and chirp-adjustment.

26 Claims, 10 Drawing Sheets

OTHER PUBLICATIONS

Mizuuchi, K. et al., *Broadening of the phase matching bandwidth in quasi phase matched second harmonic generation,* IEEE Jour, Quan. Elec., 30(7), pp. 1596–1604, 1994 (Jul.).

Bortz, M. et al., *Increased acceptance bandwidth for quasi phasematched second harmonic generation in LiNbO3 waveguides,* Elec. Lett., 30(1), pp. 34–35, 1994 (Jan.).

Fejer, M. et al., *Quasi phase matched second harmonic generation: tuning and tolerances,* IEEE Jour. Quan. Elec., 28(11), pp. 2631–2654, 1992 (Nov.).

APERIODIC QUASI-PHASEMATCHING GRATINGS FOR CHIRP ADJUSTMENTS AND FREQUENCY CONVERSION OF ULTRA-SHORT PULSES

This invention was supported in part directly by ARPA under grant number MDA972-94-1-0003 and by ARPA through the Center for Nonlinear Optical Materials under grant number ONR-N00014-92-J1903. The Government has certain rights in the invention.

FIELD OF THE INVENTION

This invention relates generally to the use of aperiodic or chirped quasi-phasematching gratings to control the chirp and frequency conversion of ultra-short optical pulses such that both frequency conversion and pulse shaping or envelope control are performed simultaneously.

BACKGROUND OF THE INVENTION

The field of optics is experiencing rapid growth as a result of numerous improvements to light sources and optical devices. Lasers capable of providing very short pulses are especially promising to further progress in this area. So are optical devices capable of performing operations to generate ultra-short pulses with durations of nano, pico and even femtoseconds. In fact, a great variety of technical applications stand to gain from high-quality ultra-short pulses exhibiting controlled frequency and chirp, or spectral distribution within the pulse envelope, and an adjustable intensity profile. Devices and methods capable of delivering suitable ultra-short pulses depend on compression and chirp control of pulses derived directly from the laser source or an interposed optical device.

The first documented attempt to compress optical pulses was disclosed by J. A. Giordmaine et al. in "Compression of Optical Pulses" published in *IEEE Journal of Quantum Electronics,* Vol. 4, No. 5, May 1968, pp. 252. A light pulse of a mode-locked laser was compressed with the aid of material dispersion in a suitable material such as bromobenzene or nitrobenzene. The temporal duration of the incident pulse underwent compression while propagating through the material. Unfortunately, the material lengths required to achieve significant narrowing were impractical for most applications.

D. Strickland et al. discussed the compression of chirped optical pulses in "Compression of Amplified Chirped Optical Pulses" published in *Optical Communications,* Vol. 56, No. 3, Dec. 1, 1985, pp. 219. The amplifier and compression system disclosed utilizes group velocity dispersion (GVD) in a fiber to disperse or stretch and chirp a pulse and a double-grating compressor to recompress the pulse. The amplification stage is arranged before the recompression such that the amplifier does not need to perform operations on the high peak power compressed pulse. The system as a whole does not actually control the chirp of the pulse as the fiber stretcher and the grating compressor are intended to exactly cancel. The authors claim that the amplification does not affect the chirp. In fact, the idea of achieving optical pulse compression by means of gratings had previously been addressed by E. Tracy in "Optical Pulse Compression with Diffraction Gratings" appearing in *IEEE Journal of Quantum Electronics,* Vol. 5, No. 9, September 1969, pp. 454.

A related dispersive arrangement designed for pulse control has been treated by F. J. Duarte in "Dispersion Theory of Multiple-Prism Beam Expanders for Pulsed Dye Lasers" published in *Optics Communications,* Vol. 43, No. 5, Nov. 1, 1982, pp. 303. In this system prisms replace the gratings or are used in conjunction with them to decompress (stretch) and recompress pulses. O. E. Martinez discusses further improvements to the grating compressor in "3000 Times Grating Compressor with Positive Group Velocity Dispersion: Application to Fiber Compensation in 1.3–1.6 μm Region" appearing in *IEEE Journal of Quantum Electronics,* Vol. 23, No. 1, January 1987, pp. 59. In particular, Martinez introduces telescopes between gratings to modify the phase shift for different spectral components of the light beam.

Solutions to adjusting chirped pulses by spatially spreading them out (dispersion), treating the different spectral components by adding a frequency dependent phase shift (path-length difference) and spatially recombining the pulses are also found in patent literature. These teachings are likewise based on the use of geometrically dispersive elements such as gratings or prisms. Examples of such methods and corresponding physical arrangements are disclosed by Heritage et al. in U.S. Pat. Nos. 4,655,547 and 4,928,316 as well as U.S. Pat. No. 4,961,195 issued to Skupsky et al. The practice of these methods is cumbersome and the necessary devices require many often bulky parts and critical alignments.

Other methods known in the prior art to compress an optical pulse include that of Chang et al. in U.S. Pat. No. 5,222,161 where the refractive index of a waveguide is dynamically altered by an electric field (electrooptic effect). The idea is that, in the temporal domain, the front end of the optical pulse is slowed down by ensuring that it travels through the material when it exhibits a higher index of refraction and the tail end is exposed to a lower index of refraction. This, of course, means that the electric field has to be modulated very fast (on the time scale of the pulse) to obtain a different index of refraction in the same medium as measured from the front to the tail of the pulse. In this manner the tail of the pulse is allowed to effectively catch up with the front of the pulse thus achieving pulse compression. The best results which can be achieved by electric modulation are limited to pulses of $\approx 10^{-11}$ seconds and they can not simultaneously adjust pulse center frequency. In fact, this latter limitation applies to all above prior art.

Michael A. Duguay et al. in "Optical Frequency Shifting of a Model-Locked Laser Beam", IEEE Journal of Quantum Electronics, August, 1968, pp. 238 discloses a frequency shifter making use of the electro-optic effect in $LiNbO_3$. The disadvantages of this device are: small shift, complexity of the device and inability to perform arbitrary phase correction in a simple fashion. Furthermore, the device is not monolithic.

Still another approach to narrowing pulses is presented by L. F. Mollenauer et al. in "Extreme Picosecond Pulse Narrowing by Means of Soliton Effect in Single-Mode Optical Fibers". The effect is achieved by spectral broadening and chirping by self-phase modulation (intensity-dependent refractive index) and compressing by GVD obtained in the fiber.

Meanwhile, methods and devices for controlling the efficiency of frequency conversion of pulses are discussed by Agnostelli et al. in U.S. Pat. Nos. 5,436,758; 5,317,666 and Field et al. in U.S. Pat. No. 5,519,802. These solutions are based on using dynamically controlled domains or gratings in a poled structure, e.g., a crystal of non-linear optical material.

In fact, all of the above prior art solutions are limited in that they do not simultaneously achieve effective, preferably passive, frequency and simultaneous chirp control in ultra-short pulses, i.e. in the nano-, pico- and femtosecond ranges. The devices and methods taught in the prior art are either for pulse compression or frequency conversion.

Nonlinear optical frequency conversion has been studied for decades. For example, second harmonic generation (SHG) is widely used to convert the wavelength produced by a laser to a shorter wavelength. Phasematching is usually required for efficient frequency conversion. In most nonlinear materials phasematching can only be achieved for certain wavelengths and within a limited spectral bandwidth. Quasi-phasematching (QPM) allows one to engineer a material chosen for qualities other than the possibility of phasematching and makes it possible to double a wide range of wavelengths at high conversion efficiencies. Efficient SHG of picosecond and femtosecond pulses in periodic QPM structures has been demonstrated. Theoretical and experimental work on using aperiodic QPM structures for increasing the wavelength acceptance bandwidth of continuous wave (cw) SHG has also be performed. The state of the art is best summarized by Toshiaki Suhara et al. in "Theoretical Analysis of Waveguide Second-Harmonic Generation Phase Matched with Uniform and Chirped Gratings" published in *Journal of Quantum Electronics,* Vol. 26, No. 7, July 1990, pp. 1265; Kiminori Mizuuchi et al. in "Broadening of the Phase-Matching Bandwidth in Quasi-Phase-Matched Second-Harmonic Generation" appearing in *IEEE Journal of Quantum Electronics,* Vol. 30, No. 7, July 1994, pp. 1596; and M. L. Bortz et al. in "Increased Acceptance Bandwidth for Quasi-Phasematched Second Harmonic Generation in $LiNbO_3$ Waveguides" presented in *Electronics Letters,* Vol. 30, No. 1, Jan. 6, 1994, pp. 34. These analyses and experiments do not address effects on ultra-short pulses.

M. M. Fejer et al. in their paper entitled "Quasi-Phase-Matched Second Harmonic Generation: Tuning and Tolerances" appearing in IEEE Journal of Quantum Electronics, Vol. 28, No. 11, November 1992, pp. 2631 present an in-depth analysis of QPM. Here, the engineering of grating structures is seen as means to design tuning curves to use the tradeoffs between conversion efficiencies, tuning properties and acceptance bandwidths for SHG. The approach is based on the principle that the Fourier transform relationship between the tuning curve and the longitudinal profile of the nonlinear coefficient can be used to engineer tuning curves. This formalism was only applied to cw inputs and discussed the phase response solely in so much as it is an undesirable side-effect which can affect tuning curve shapes.

It is clear, that none of the prior art references have been designed to simultaneously vary the chirp to control the pulse envelope and convert the frequency of a pulse.

OBJECTS AND ADVANTAGES OF THE INVENTION

Accordingly, it is a primary object of the present invention to provide a method and an apparatus for simultaneous chirp adjustment and frequency conversion of optical pulses in the broadest sense. Specific applications include pulse compression, dilation, chirp reversal or other modification to the pulse envelope performed in conjunction with frequency conversion.

It is another objective of the invention for the method to be simple to practice and the apparatus to be easy to construct from quasi-phasematching structures and simple to adapt to any ultra-short pulses to be treated. In particular, the invention should enable efficient treatment of pulses in the nano-, pico-, femtosecond ranges and shorter.

Yet another object of invention is to provide for the apparatus to be passive, if desired, thus eliminating the need for active control and the complications brought thereby.

SUMMARY OF THE INVENTION

The objects and advantages of the invention are attained by an apparatus for simultaneous chirp adjustment and frequency conversion of an ultra-short input optical pulse $A_1$ characterized by a center angular frequency $\omega_{1,0}$. The apparatus has a non-linear optical material with a quasi-phasematching (QPM) grating exhibiting an aperiodic pattern of regions $D_j$. The aperiodic pattern is such that passing the ultra-short input optical pulse $A_1$ through the regions $D_j$ gives rise to a chirp-adjusted and frequency-converted output optical pulse $A_2$. The regions $D_j$ of the QPM have corresponding non-linear properties defined by non-linear coefficients $d_j$. To achieve quasi-phasematching the non-linear coefficients $d_j$ alternate (or vary) between said regions $D_j$ either in magnitude or sign (direction).

In one advantageous embodiment the non-linear optical material is a Second Harmonic Generator (SHG) such that the output optical pulse $A_2$ generated from the input optical pulse $A_1$ is the second harmonic of said ultra-short input optical pulse $A_1$.

In addition to non-linear coefficients $d_j$ the regions $D_j$ are also characterized by widths $\Lambda_j$. These coefficients and widths are chosen such that the action of regions $D_j$ on input optical pulse $A_1$ is expressed by a transfer function $\hat{D}(\Omega)$, where $\Omega = \omega - \omega_{1,0}$ and $\omega$ is the angular frequency, such that:

$$\hat{A}_2(\Omega) = \hat{D}(\Omega) \cdot \widehat{A_1^2}(\Omega).$$

In this equation $\widehat{A_1^2}(\Omega)$ is the Fourier transform of the square of input optical pulse $A_1$ and $\hat{A}_2(\Omega)$ is the Fourier transform of output optical pulse $A_2$. Similar equations hold for interactions such as sum frequency generation (SFG), difference frequency generation (DFG) and optical parametric amplification (OPA).

The operation of the apparatus and the design parameters are best understood when the input pulse $A_1$ is treated as a packet or envelope containing a number of frequency components. Thus, the input pulse $A_1$ consists of angular frequency components $\omega_{1,i}$ including the center angular frequency $\omega_{1,0}$. The widths $\Lambda_j$ of regions $D_j$ are selected such that nearly locally periodic groups of these regions act on each of the angular frequency components $\omega_{1,i}$ of input pulse $A_1$ to generate corresponding output angular frequency components $\omega_{2,i}$ which make up the output pulse $A_2$. Specifically, conversion of components $\omega_{1,i}$ to output components $\omega_{2,i}$ occurs in that portion of the non-linear material where input pulse $A_1$ passes through a group of regions $D_j$ for which:

$$\Lambda_j \approx \lambda_{1,i}/4(n_2 - n_1).$$

where $\lambda_{1,i}$ are the wavelengths of components $\omega_{1,i}$, while $n_1$ and $n_2$ are the indices of refraction experienced by components $\omega_{1,i}$ and $\omega_{2,i}$ respectively. In other words, the location in the nonlinear medium where the frequency conversion of components $\omega_{1,i}$ to output components $\omega_{2,i}$ takes place is predetermined by the location of the group of regions $D_j$ which has nearly equal widths $\Lambda_j$ tuned to convert the particular frequency component. Due to the group velocity mismatch (GVM) there is a walk-off between components $\omega_{1,i}$ and output components $\omega_{2,i}$ and so, in the case of SHG, output pulse $A_2$ will generally fall behind input pulse $A_1$, and will do so by an amount determined by the position at which the frequency conversion takes place.

The designer of the apparatus takes advantage of this fact to derive aperiodic patterns of regions $D_j$ representing specific transfer functions $\hat{D}(\Omega)$ In one embodiment regions $D_j$ are arranged in groups in order of increasing widths $\Lambda_j$. This pattern can be used to derive output pulse $A_2$ which is compressed and has no chirp from an input pulse $A_1$ which is temporally long and chirped in a particular direction depending on the sign of the GVM parameter. Arranging groups of regions $D_j$ in order of decreasing widths $\Lambda_j$ can be used to stretch output pulse $A_2$ relative to input pulse $A_1$ or generate chirp from a shorter input pulse $A_1$ exhibiting no chirp. In fact, regions $D_j$ can be arranged in groups of any order to fit a particular transfer function $\hat{D}(\Omega)$ to produce the desired output pulse $A_2$.

The appropriate aperiodic pattern of regions $D_j$ can be obtained in many types of non-linear media. For example, in a ferroelectric crystal the aperiodic pattern can be an aperiodically poled pattern of ferroelectric domains. According to one embodiment regions $D_j$ are grown sequentially. In another embodiment regions $D_j$ can be aperiodically poled using electric fields as taught by prior art techniques. For corresponding teaching see U.S. Pat. No. 5,193,023 by Yamada.

The invention also presents a method for simultaneous chirp adjustment and frequency conversion using QPM in the non-linear optical material with an aperiodic pattern of regions $D_j$. This is done according to the principle of control of the transfer function $\hat{D}(\Omega)$ via selection of coefficients $d_j$ and widths $\Lambda_j$ of regions $D_j$ as discussed above. In particularly advantageous applications of the method regions $D_j$ are arranged in such an order that output pulse $A_2$ has no chirp when input optical pulse $A_1$ has chirp and vice versa.

In a general sense, the method teaches how to arrange groups of regions $D_j$ in such an order that output pulse $A_2$ has a modified chirp in comparison to the chirp of input pulse $A_1$. The modification to the chirp can involve the chirp's magnitude and/or direction (e.g., the chirp can be reversed). The resulting output pulse $A_2$ can be compressed or stretched as a result because the envelope shape changes. Furthermore, the arrangement of regions $D_j$ can be tailored to the chirp of input pulse $A_1$. This is of particular interest when the chirp of pulse $A_1$ is known a priori. Such situations arise when the pulse source or any processing device from which input pulse $A_1$ is derived exhibits pulse-to-pulse stability.

A detailed description of the apparatus and method is set forth below in reference to the drawing figures.

DETAILED DESCRIPTION

The invention is based on combining the processes of chirp adjustment and frequency conversion to thus derive from input optical pulses chirp-adjusted and frequency-converted output optical pulses. A general schematic diagram illustrating the combination of chirp adjustment and frequency conversion, second harmonic generation (SHG) in particular, is shown in FIG. 1.

Figure 1:
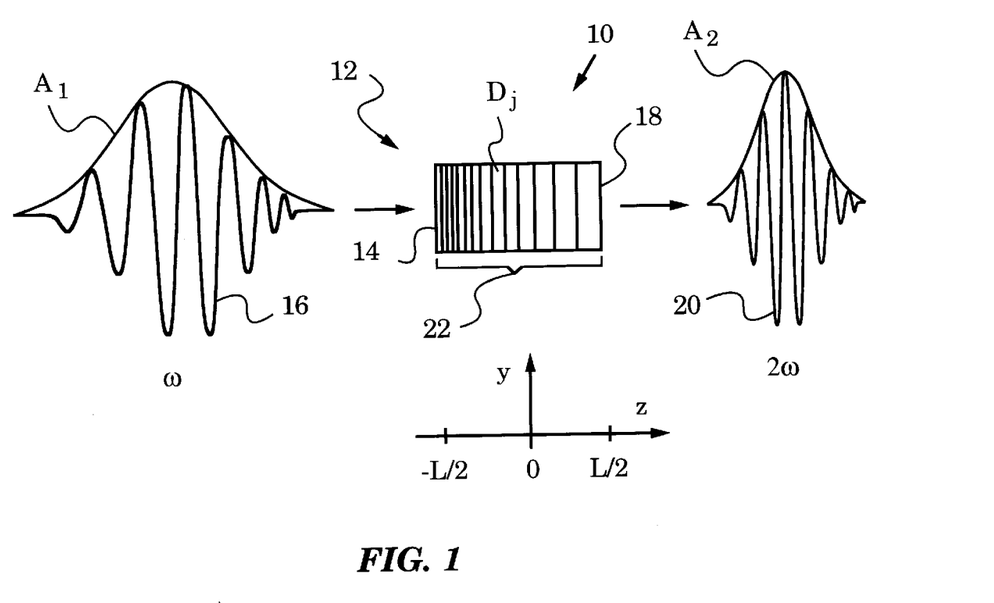
FIG. 1 is a general schematic diagram illustrating SHG in a non-linear material having an aperiodic pattern of regions $D_j$.

FIG. 1 is a general diagram of the preferred embodiment of an apparatus 10 for chirp adjustment and frequency conversion. Apparatus 10 is essentially made up of a non-linear optical material 12, in this case a material which, under well-known conditions, doubles the frequency of light propagating through it. For convenience, a length L of non-linear material 12 is indicated on the z-axis (from $-L/2$ to $L/2$). In practice, length L is selected based on the bandwidth of an ultra-short input optical pulse $A_1$ and aperiodicity of a quasi-phasematching (QPM) grating 22 as discussed below.

Non-linear material 12 has an input facet 14 for admitting ultra-short input optical pulse $A_1$ and an output facet 18 for emitting an output optical pulse $A_2$. Of course, any way in which light can be coupled into material 12. In one possible scenario, a GaAs laser supplying the light to apparatus 10 can be a part of the latter. As shown, the angular frequency $\omega$ of input pulse $A_1$ is doubled to $2\omega$ in output pulse $A_2$. To achieve efficient SHG non-linear material 12 has quasi-phasematching (QPM) grating 22 created by an aperiodic pattern of regions $D_j$. The general concept of QPM is well-known in the art. Suitable materials for QPM are well-known and include crystals such as $LiNbO_3$, $LiTaO_3$, KTP, KTA, isomorphs of KTP, other suitable ferroelectrics or poled non-linear optical polymer materials or still other materials in which poling is practicable. Materials not requiring active poling are preferred, since apparatus 10 using such materials is passive.

Input pulse $A_1$ can originate from an ultra-fast laser system (not shown). These devices typically generate optical pulses with durations of $10^{-14}$ to $10^{-10}$ seconds, translating into bandwidths of at least $10^{10}$ to $10^{14}$ Hz. To be useful in many applications, input pulse $A_1$ has to have a minimum time-bandwidth product, i.e., input pulse $A_1$ has to be transform-limited. Many important ultra-fast laser systems naturally produce non-transform-limited pulses with characteristic spectral phase structure. These non-transform-limited pulses are termed "chirped", as the instantaneous frequency or wavelength varies during the pulse.

Input pulse $A_1$ is a chirped pulse, as evidenced by its wave packet 16. Specifically, wave packet 16 spans a bandwidth of frequencies or a spectrum of frequency components. This is clearly seen in the diagram as the frequency of input pulse $A_1$ decreases from right to left, i.e., input pulse $A_1$ exhibits a decreasing chirp. In the diagram of FIG. 1, a wave packet 20 of desirable output pulse $A_2$ exhibits no chirp. In other words, output pulse $A_2$ is chirp-adjusted to zero chirp and frequency-converted to $2\omega$.

Figure 2A:
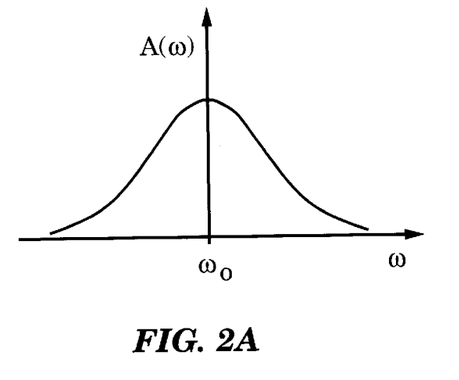
FIG. 2A is a graph showing a gaussian amplitude distribution of an input optical pulse $A_1$.
Figure 2B:
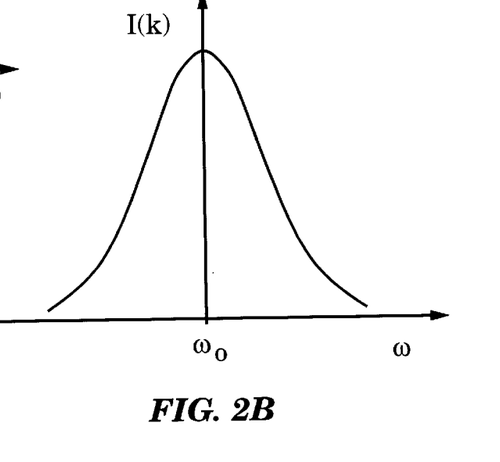
FIG. 2B is a graph showing a gaussian intensity distribution of input optical pulse $A_1$.

In order to appreciate the structure of apparatus 10 which permits to derive such chirp-adjusted and frequency-converted output pulse $A_2$ a more detailed consideration of input pulse $A_1$ and QPM grating 22 is required. For purposes of review, FIGS. 2A and 2B illustrate the amplitudes $A(\omega)$ and intensities $I(\omega)$ of a gaussian wave packet as a function angular frequency $\omega$. The most important contribution in both graphs is due to components close to and centered about the center wave number $k_o$. In a similar vein, for the purposes of this invention it is convenient to consider input pulse $A_1$ as centered about a center frequency.

Figure 3:
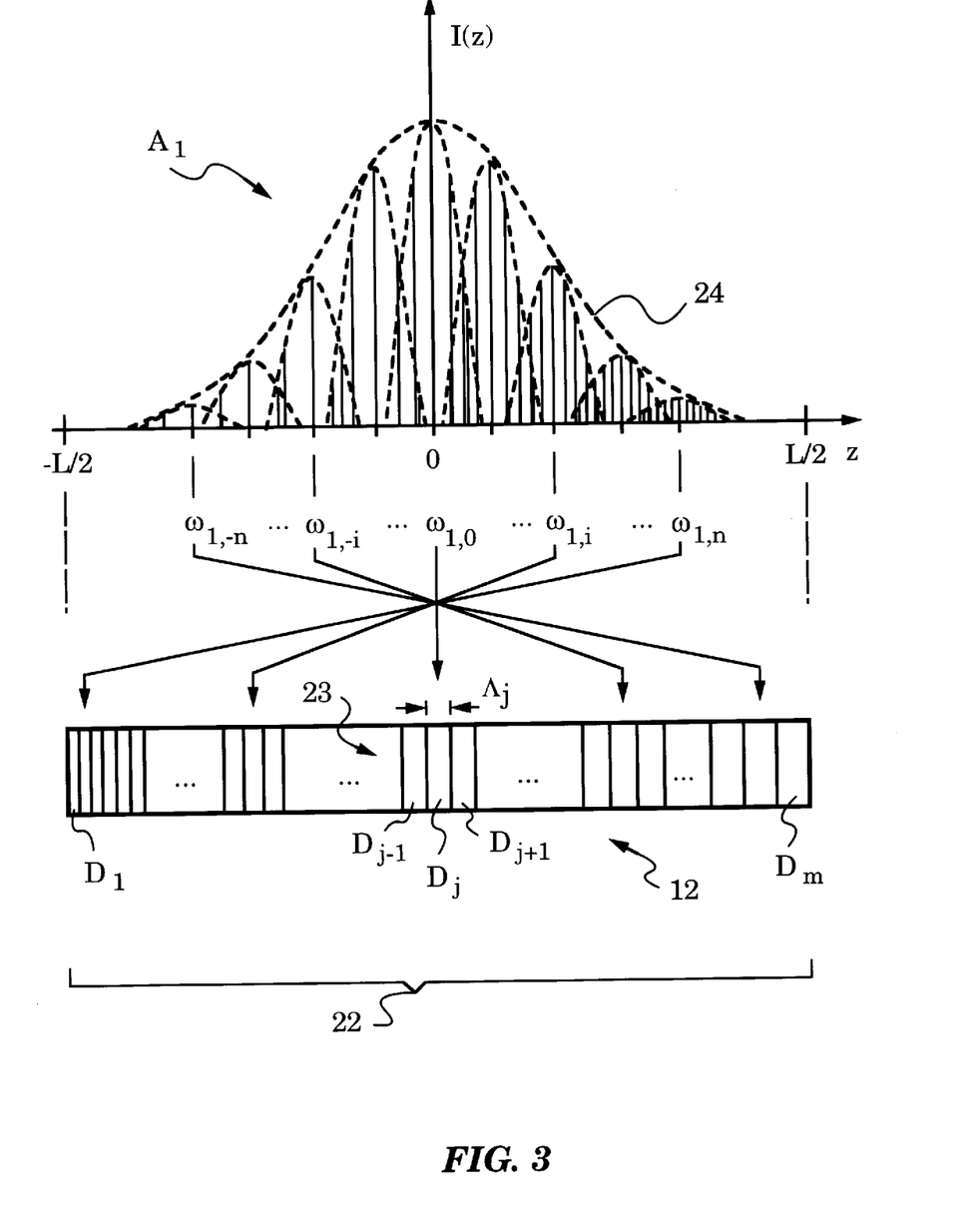
FIG. 3 is a diagram illustrating the operation of the apparatus of the invention for gaussian input pulse $A_1$ with decreasing chirp.

Specifically, FIG. 3 shows the intensity $I(z)$ of input pulse $A_1$ in the form of an envelope 24 containing input angular frequency components $\omega_{1,i}$ centered about a center angular frequency $\omega_{1,0}$. Input pulse $A_1$ moves to the right through medium 12 and hence its chirp is decreasing. For better visualization, envelope 24 as well as the envelopes of input angular frequency components $\omega_{1,i}$ are indicated by dashed lines. The first subscript index, 1, refers to the fact that these angular frequency components $\omega_{1,i}$ belong to input pulse $A_1$. The second subscript index, i, designates a particular angular frequency component ranging from $-n$ to $n$. Thus, the bandwidth of input pulse $A_1$ is clearly identified by the range of frequency components from $\omega_{1,-n}$ to $\omega_{1,n}$. Typical bandwidth of input pulse $A_1$ will vary from at least $10^{10}$ to $10^{14}$ Hz, depending on the source.

The shape of envelope 24 is gaussian but it does not represent a limitation on the form of input pulse $A_1$. This shape is selected for reasons of clarity in the theoretical explanation of the operation of apparatus 10 presented below.

The diagram of FIG. 3 also illustrates grating 22 and specifically designates a group 23 of regions $D_{j-1}$ through $D_{j+1}$ with their corresponding widths $\Lambda_{j-1}$ through $\Lambda_{j+1}$. Although, in FIG. 3, group 23 has only 3 regions it is known that the number of regions $D_j$ in group 23 should be sufficiently large to ensure efficient conversion of one frequency component $\omega_{1,i}$. As a general rule, the larger the number of regions $D_j$ in group 23 the more effective will be the conversion of component $\omega_{1,i}$. Thus, index j runs from 1 to m, where $m >> 2n+1$, in order to account for sufficiently large groups.

Figure 4A:
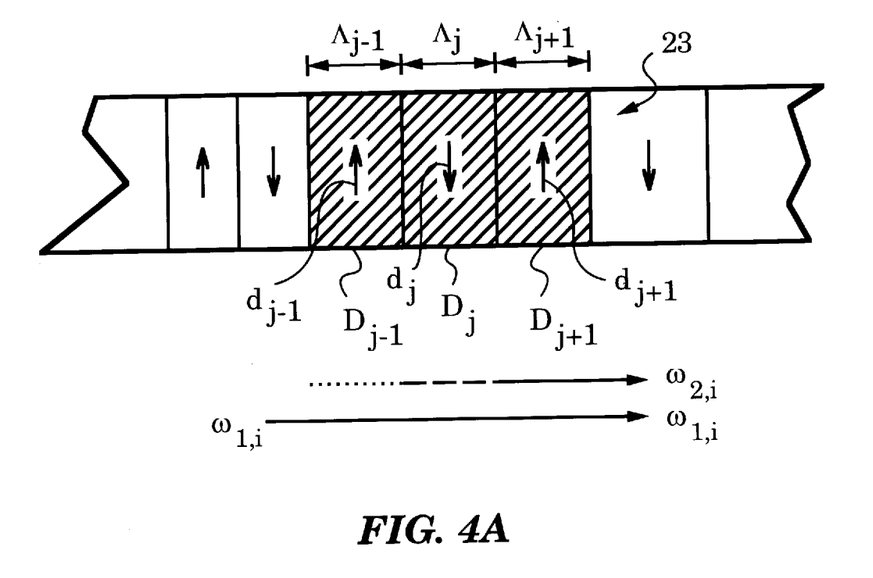
FIG. 4A is an enlarged diagrammatic view of the frequency conversion process in a group of regions $D_j$ having non-linear coefficients $d_j$ of alternating sign.
Figure 4B:
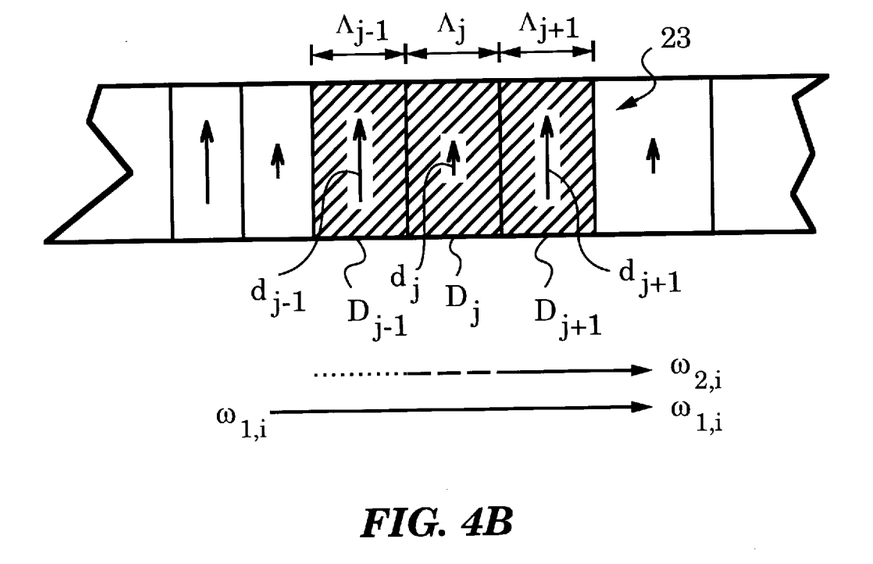
FIG. 4B is an enlarged diagrammatic view of the frequency conversion process in a group of regions $D_j$ having non-linear coefficients $d_j$ of alternating magnitude.

QPM and consequent efficient SHG is achieved because regions $D_j$ have corresponding non-linear properties defined by non-linear coefficients $d_j$. The value of these non-linear coefficients $d_j$ differs between regions $D_j$. In the preferred embodiment it is the sign or direction of coefficients $d_j$ that alternates between regions $D_j$. This is illustrated in FIG. 4A where arrows represent coefficients $d_j$. The arrows alternate in direction from region to region. In particular, the arrow designating coefficient $d_{j-1}$ points in a direction opposite from that of the arrow designating coefficient $d_j$. The following arrow represents coefficient $d_{j+1}$ and points in the same direction as that of $d_{j-1}$. This direction or sign reversal is preferred because it produces the largest difference in non-linear property between adjacent regions $D_j$.

Of course, it is also possible to alternate the magnitude of coefficients $d_j$ between a small value (e.g., zero) and a large value. This alternative is illustrated in FIG. 4A. Here, the magnitudes of coefficients $d_{j-1}$ and $d_{j+1}$ are equal and small (ideally zero), while the magnitude of coefficient $d_j$ is large.

As noted above, widths $\Lambda_{j-1}$ through $\Lambda_{j+1}$ of group 23 of regions $D_{j-1}$ through $D_{j+1}$ are approximately equal. They are selected such that one angular frequency component $\omega_{1,i}$ of input pulse $A_1$ generates corresponding output angular frequency component $\omega_{2,i}$ which makes up a portion of the output pulse $A_2$. In the example of FIG. 4A the conversion of component $\omega_{1,i}$ to output component $\omega_{2,i}$ occurs in group 23 of regions $D_{j-1}$ through $D_{j+1}$ since:

$$\Lambda_j \approx \lambda_{1,i}/4(n_2-n_1),$$

holds for widths $\Lambda_{j-1}$ through $\Lambda_{j+1}$. In this equation $\lambda_{1,i}$ are the wavelengths of components $\omega_{1,i}$, while $n_1$ and $n_2$ are the indices of refraction experienced by components $\omega_{1,i}$ and $\omega_{2,i}$ respectively in non-linear medium 12. Thus, second harmonic frequency component $\omega_{2,i}$ ($\omega_{2,i}=2\omega_{1,i}$) is generated from the driving polarization due to input component $\omega_{1,i}$. As indicated in the drawing, when this occurs the original input component $\omega_{1,i}$ continues to propagate along its path as does the newly generated output component $\omega_{2,i}$.

Since output component $\omega_{2,i}$ thus generated has twice the frequency of input component $\omega_{1,i}$, it experiences a different group velocity than input component $\omega_{1,i}$. This causes output component $\omega_{2,i}$ to travel through medium 12 at a different rate, usually slower, than input component $\omega_{1,i}$. Still differently put, output component $\omega_{2,i}$ experiences a group velocity mismatch (GVM) with respect to input component $\omega_{1,i}$. The GVM is intrinsic and characteristic of the specific non-linear material 12 and causes a walk-off effect observed between input components $\omega_{1,i}$ and output components $\omega_{2,i}$.

In the aperiodic pattern shown in FIG. 3 regions $D_j$ are arranged in groups in order of increasing widths $\Lambda_j$. The arrows indicate the position where representative input components, namely $\omega_{1,-n}$, $\omega_{1,-i}$, $\omega_{1,0}$, $\omega_{1,i}$ and $\omega_{1,n}$, are frequency-converted by grating 22. Clearly, the highest frequency component, $\omega_{1,n}$, is converted to $\omega_{2,-n}$ in the first portion of grating 22 in that group of regions where the above-discussed matching condition is satisfied. The other frequency components are converted in subsequent groups of regions wherever the matching condition is met. In the preferred embodiment grating 22 is dimensioned in such a way that center angular frequency $\omega_{1,0}$ is converted in the middle of non-linear medium 12.

Figure 5:
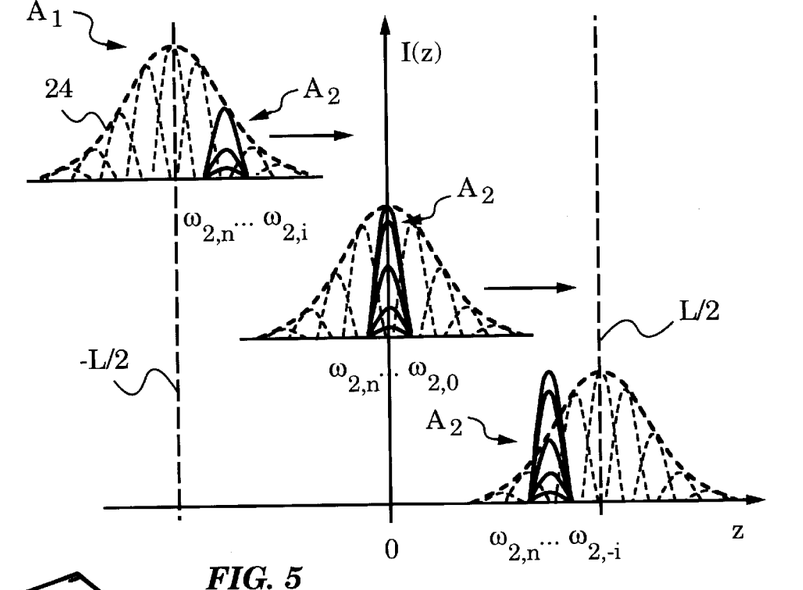
FIG. 5 is a diagram illustrating the chirp adjustment and frequency conversion processes.

The effect of grating 22 on input pulse $A_1$ is best explained in the diagram of FIG. 5. This diagram shows input pulse $A_1$ at three positions as it passes through non-linear medium 12 (not shown in this drawing for reasons of clarity) along the z direction. Specifically, the three locations chosen correspond to positions when the intensity maximum of envelope 24 or when center angular frequency $\omega_{1,0}$ is at $z=-L/2$, 0 and $L/2$.

At $z=-L/2$ a number of high-frequency input components $\omega_{1,n}$ through $\omega_{1,i}$ have already undergone SHG. Because of the walk-off effect the corresponding output components $\omega_{2,n}$ through $\omega_{2,i}$ indicated by the solid lines have fallen behind input components $\omega_{1,n}$ through $\omega_{1,i}$ which created them. Actually, at $z=-L/2$ input component $\omega_{1,i}$ is in the process of generating output component $\omega_{2,i}$ and the two are thus superimposed in the diagram. In fact, in the preferred embodiment in which final output pulse $A_2$ is compressed and has no chirp the walk-off effect is specifically calculated to cause each output component already converted to fall behind the input component giving rise to it by such a distance as to become superimposed on the next output component being generated from the subsequent input component. Eventually, all output components become superimposed as shown to yield final output pulse $A_2$.

At z=0 one half of input components or all components ranging from $\omega_{1,n}$ through $\omega_{1,1}$ have undergone SHG and center component $\omega_{1,0}$ is just being frequency doubled. Due to the walk-off effect the corresponding output components $\omega_{2,n}$ through $\omega_{2,0}$ are superimposed on one another. At L/2 input components ranging from $\omega_{1,n}$ through $\omega_{1,-i}$ have been frequency doubled to corresponding output components $\omega_{2,n}$ through $\omega_{2,-i}$, which are collapsed or compressed as shown by the solid lines.

Thus, after passing through entire non-linear medium 12, input pulse $A_1$ gives rise to an output pulse $A_2$ consisting of frequency-converted output components $\omega_{2,n}$ through $\omega_{2,-n}$ superimposed on each other. This means that output pulse $A_2$ is also chirp-adjusted. In particular, output pulse $A_2$ has no chirp, since all the frequency components are collapsed in it.

It should be noted that the process is self-tuning in the sense that proper output pulse $A_2$ will be generated as long as grating 22 contains the necessary regions $D_j$ arranged in the proper order to convert input pulse $A_1$. In other words, any additional bandwidth that grating 22 may be tuned to but is not found among frequency components $\omega_{1,i}$ of input pulse $A_1$ will not affect the process in the low conversion limit.

Figure 6:
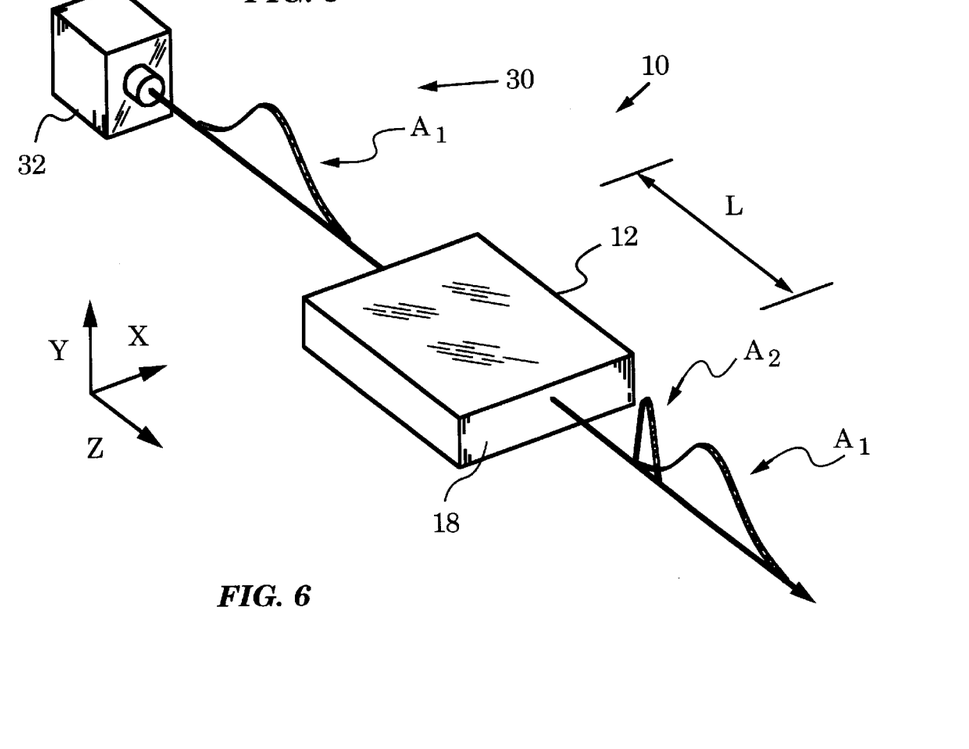
FIG. 6 is an isometric view of a apparatus of the invention.

A system 30 for using apparatus 10 is shown in FIG. 6. Input pulse $A_1$ is derived from a source 32. Source 32 can be an ultra-fast laser or an entire optical system issuing forth ultra-short pulses requiring frequency conversion and chirp adjustment. Furthermore, source 32 is assumed to produce the chirp of input pulse $A_1$ as discussed.

The operation of apparatus 10 is exactly as described above. After passing through non-linear medium 12, which is preferably passive, and exiting through output facet 18, input pulse $A_1$ and output pulse $A_2$ are resolved due to the walk-off effect. Compressed output pulse $A_2$ can be used downstream for any intended application (not shown).

The above-described preferred embodiment eliminates a specific (decreasing) chirp and frequency doubles an input pulse $A_1$ to produce a compressed output pulse $A_2$ with no chirp. The apparatus of invention, however, can be designed to modify or alter any arbitrary chirp while performing frequency conversion. To elucidate the general nature of the invention, it is important to better understand the theory behind its operation.

The effect of grating 22 can be expressed with the aid of a transformation which describes the generation of output pulse $A_2$ from input pulse $A_1$. In a general manner, coefficients $d_j$ and widths $\Lambda_j$ determine the action of regions $D_j$ on input optical pulse $A_1$ as expressed by a transfer function $\hat{D}(\Omega)$, where $\Omega=\omega-\omega_{1,0}$ and $\omega$ is the angular frequency, such that:

$$\hat{A}_2(\Omega)=\hat{D}(\Omega)\cdot\hat{A}_1^2(\Omega), \quad (1)$$

In this equation $\hat{A}_1^2(\Omega)$ is the Fourier transform of the square of input optical pulse $A_1$ and $\hat{A}_2(\Omega)$ is the Fourier transform of output optical pulse $A_2$. This condition holds under the assumptions of plane-wave undepleted-pump SHG of ultra-short pulses with pulse lengths short enough that GVM is a significant effect but for which intra-pulse GVD can be neglected.

Transfer function $\hat{D}(\Omega)$ can be expressed as:

$$\hat{D}(\Omega) = \Gamma \int_{-\infty}^{+\infty} \bar{d}(z')\exp(i[\Delta k_o + \Omega\Delta]z')dz', \quad (2)$$

where $\Delta k_o = 4\pi(n_2-n_1)/\lambda_{1,0}$ is the k-vector mismatch defined for refractive indices evaluated at center angular frequency $\omega_{1,0}$ of input pulse $A_1$ and $\omega_{2,0}$, the second harmonic thereof. $\Delta$ is the group velocity mismatch between frequency components of input pulse $A_1$ and output pulse $A_2$ expressed as $\Delta==[(v_{g1})^{-1}-(v_{g2})^{-1}]$. Non-linear coefficients $d_j$ are jointly expressed as a function of z in the form of normalized nonlinearity $\bar{d}(z')=d(z')/d_{eff}$, where $d_{eff}$ is the maximum effective nonlinearity and the prime on the z coordinate indicates that z' is an integration variable. The constant $\Gamma$ is defined as $\Gamma=-i\pi d_{eff}/\lambda_{1,0}n_2$. Clearly, $\bar{d}(z')=0$ outside medium 12, or when $|z|>L/2$.

It will be appreciated by one skilled in the art that the above two equations are all that is required to derive the sizes of all regions $D_j$ in grating 22 to fit any arbitrary transfer function $\hat{D}(\Omega)$. This means that any desired chirp of output pulse $A_2$ and envelope shape can be calculated in advance when $A_1$ is known by using the above formalism.

In the preferred embodiment, QPM grating 22 has a slowly varying spatial frequency satisfying quasi-phasematching at the center of non-linear material 12 for center angular frequency $\omega_{1,0}$ of input pulse $A_1$. Using a standard Taylor power series expansion of k-vector mismatch $\Delta k$ around $\Delta k_o$ at z=0 the spatial non-linear coefficient distribution is:

$$\bar{d}(z)=\exp[-i(\Delta k_o z+D_{g2}z^2+D_{g3}z^3+\ldots)]\text{rect}(z/L), \quad (3)$$

where $\text{rect}(x)=\{1 \text{ if } |x|\leq\frac{1}{2}, 0 \text{ if } |x|>\frac{1}{2}\}$ to ensure $\bar{d}(z)=0$ outside medium 12. $D_{g2}$, $D_{g3}$ ... are parameters chosen to optimize the chirp control process. A person with average skill in the art will recognize that $\bar{d}(z)$ dictates directly how to design grating 22 to an arbitrary precision, depending on how many terms in the power series are used. For reasons of simplicity, the following derivation will only take into account the first term ($D_{g2}z^2$). In fact, using only the first dispersive term will, in most cases, achieve sufficiently precise grating 22.

Figure 7:
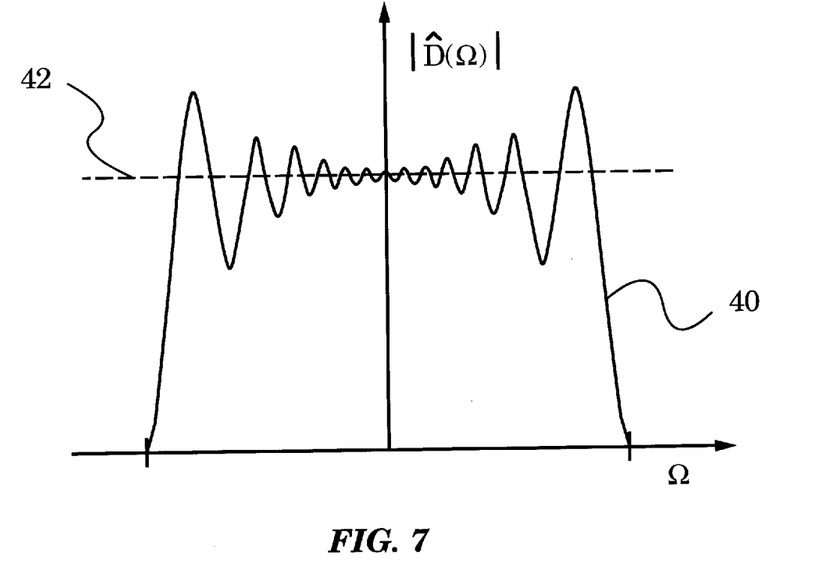
FIG. 7 is a graph of the magnitude of an example transfer function $\hat{D}(\Omega)$ for the simplest grating chirp.

Now, substituting the expression for $\bar{d}(z)$ with only the first expansion term into the equation for $\hat{D}(\Omega)$ one obtains:

$$\hat{D}(\Omega) = \Gamma \int_{-\infty}^{+\infty} \text{rect}(z'/L)\exp(-i[D_{g2}z'^2 + \Omega\Delta z'])dz', \quad (4)$$

which is a well-known Fresnel integral 40. The graph of integral 40 is found in FIG. 7. When the bandwidth of transfer function $\hat{D}(\Omega)$ exceeds that of input pulse $A_1$, and when the bandwidth of transfer function $\hat{D}(\Omega)$ is larger than the bandwidth of input pulse $A_1$, $\hat{D}(\Omega)$ can be accurately approximated for the purposes of the invention by function 42 (see FIG. 6):

$$\hat{D}(\Omega) = \Gamma \sqrt{\pi/D_{g2}} \, \exp(i\Delta^2\Omega^2/4D_{g2}). \quad (5)$$

This function assumes that the length of medium 12 is infinite and neglects a constant phase factor. In this form transfer function $\hat{D}(\Omega)$ is easy to evaluate and a person of average skill in the art can use it directly to design grating 22 or any other grating for simultaneous frequency conversion and adjustment of linear chirp of a pulse (i.e., when $D_{g3}$ and higher order terms are zero).

In the preferred embodiment input pulse $A_1$ is gaussian and has a decreasing chirp. Such pulse can be considered as the result of dispersing a transform-limited pulse with 1/e power half-width $\tau_o$ and amplitude $A_1$ in a linear delay line with GVD of $D_p$, resulting in a temporal envelope of:

$$A_1(t) = A_1 \frac{\tau_o}{\sqrt{\tau_o^2 - iD_{g2}}} \exp[-t^2/2(\tau_o^2 - iD_{g2})], \qquad (6)$$

whose length is given by:

$$\tau = \sqrt{\tau_o^2 + (D_p/\tau_o)^2} \; . \qquad (7)$$

The spectral envelope of the square of this pulse is:

$$\hat{A}_1^2(\Omega) = \sqrt{\pi} \; A_1^2 \frac{\tau_o}{\tau} \; \sqrt{\tau_o^2 - iD_p} \; \exp\left( \frac{1}{4} [\tau_o^2 - iD_p] \Omega^2 \right). \qquad (8)$$

As noted above, the length of medium 12 should be sufficiently long so that function 42 can be used to approximate transfer function $\hat{D}(\Omega)$. In this case the condition for using function 42 is that $L>2|\Delta/\tau_o D_{g2}|$. Substitution of the above function (8) and function 42 into function (2) and inverse Fourier transformation thus yields:

$$A_2(t) = \Gamma \sqrt{\pi/D_{g2}} \; A_1^2 \frac{\tau_o}{\tau} \; \frac{\sqrt{\tau_o^2 - iD_p}}{\sqrt{\tau_o^2 - iD_{SH}}} \exp(-t^2/[\tau_o^2 - iD_{SH}]), \qquad (9)$$

where $D_{SH}=D_p+\Delta^2/D_{g2}$. The length of this second harmonic pulse $A_2$ is:

$$\tau_{SH} = \frac{1}{\sqrt{2}} \; \sqrt{\tau_o^2 + (D_{SH}/\tau_o)^2} \; . \qquad (10)$$

Now, in grating 22 of the preferred embodiment regions $D_j$ satisfy the equation:

$$D_{g2} = -\Delta^2/D_p. \qquad (11)$$

Thus the chirp of input pulse $A_1$ is compensated, resulting in second harmonic pulse $A_2$, to within a constant phase factor, of:

$$A_2(t) = \Gamma(\sqrt{\pi D_p} \; /\Delta) A_1^2 \sqrt{\tau_o/\tau} \; \exp(-t^2/\tau_o^2). \qquad (12)$$

Figure 16:
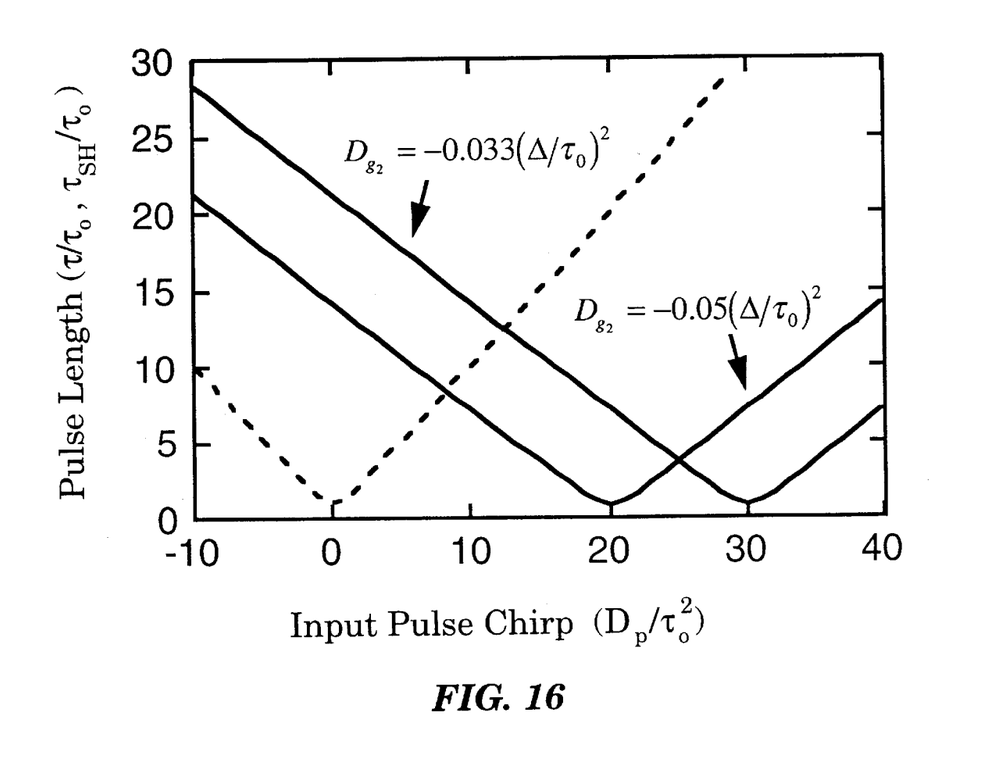
FIG. 16 is a graph showing input pulse length and output pulse length versus input pulse dispersion.

The shortest possible length of output pulse $A_2$ in this case is $\tau_o/\sqrt{2}$, or the same as that obtained with SHG of unchirped gaussian pulses in homogeneous materials. Such pulse represents the preferred result since all chirp is eliminated and maximum pulse compression is achieved. FIG. 16 illustrates the lengths of fundamental pulse or input pulse $A_1$ and second harmonic pulse or output pulse $A_2$ for two values of $D_{g2}$ plotted against input pulse dispersion $D_p$.

Figure 8:
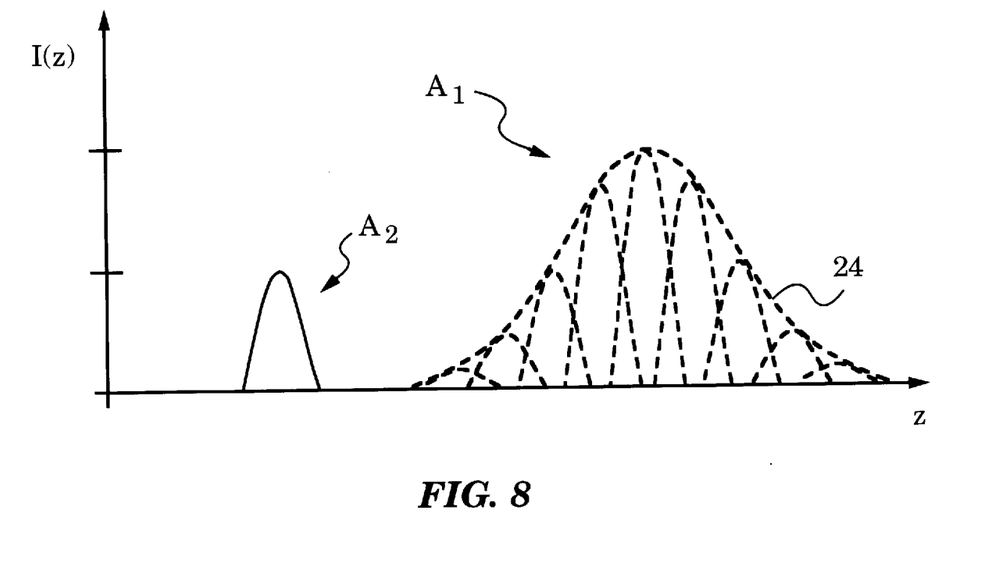
FIG. 8 is a graph showing input optical pulse $A_1$ and output pulse $A_2$ produced by the apparatus of FIG. 6.

It should be observed that output pulse $A_2$ will have a lesser intensity than input pulse $A_1$. FIG. 8 illustrates this fact for input pulse $A_1$ and output pulse $A_2$ in the preferred embodiment. The exact intensity of output pulse $A_2$ will depend on the conversion efficiency $\eta$ governed by well-known principles of SHG in nonlinear materials. $\eta$ can be calculated from the ratio of the time integrals of the square magnitudes of $A_2(t)$ to $A_1(t)$.

Figure 9:
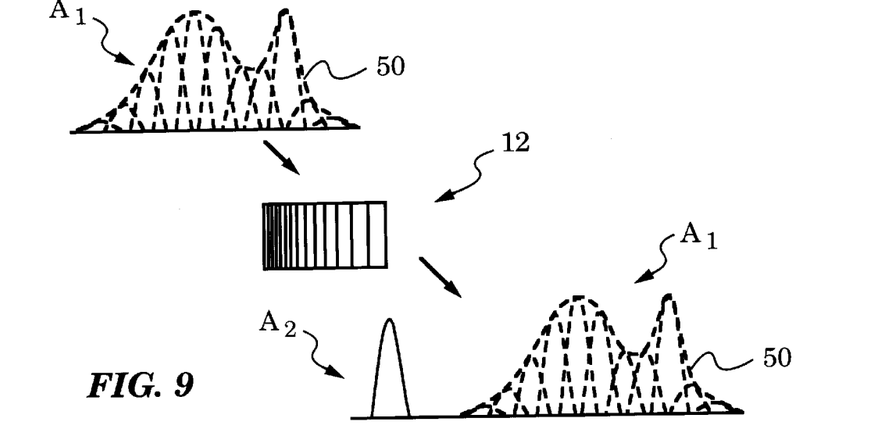
FIG. 9 diagram illustrating the elimination of chirp in an arbitrary input pulse $A_1$ envelope.

Although the specific derivation explained above applies to gaussian pulses, it is clear that the envelope of input pulse $A_1$ may have a different shape. FIG. 9 illustrates pulse $A_1$ with an irregular envelope 50. In practice, irregular envelope 50 is common, e.g., it may be due to a complex laser system. Still, when pulse $A_1$ passes through medium 12 the resulting output pulse $A_2$ is compressed and has no chirp.

Figure 10:
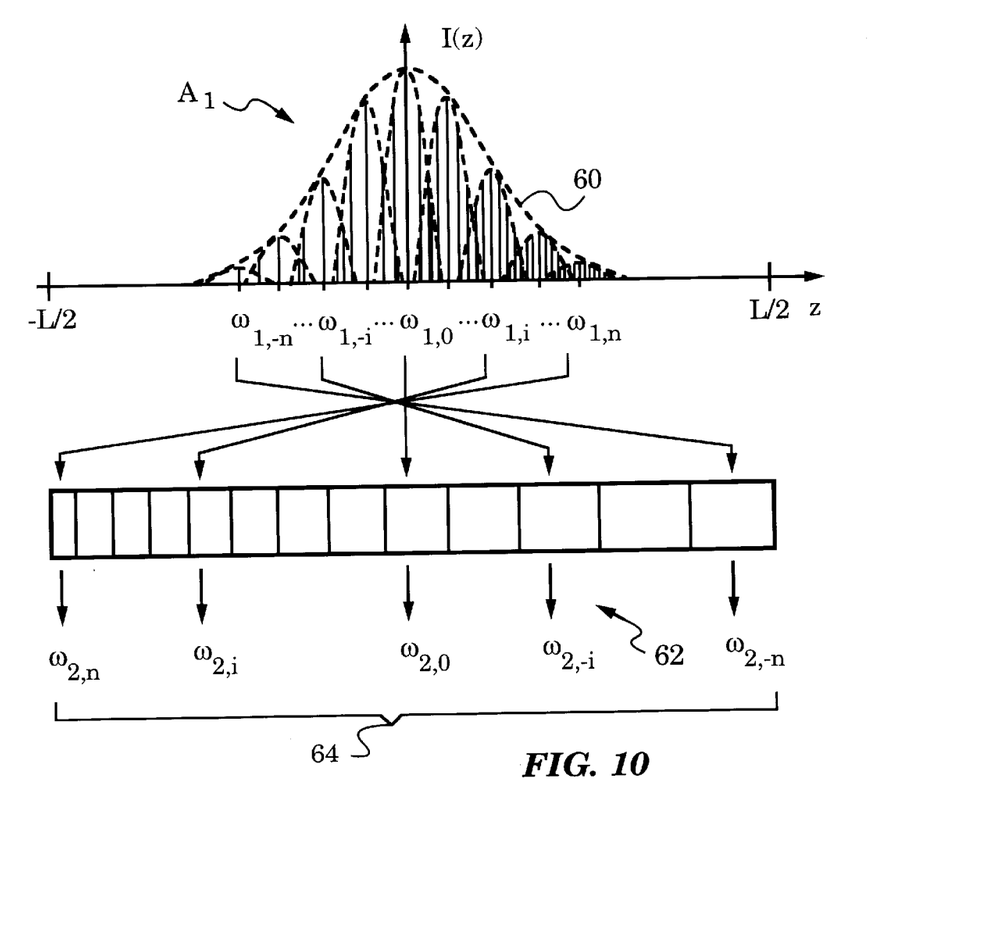
FIG. 10 is a diagram illustrating chirp reversal.
Figure 11:
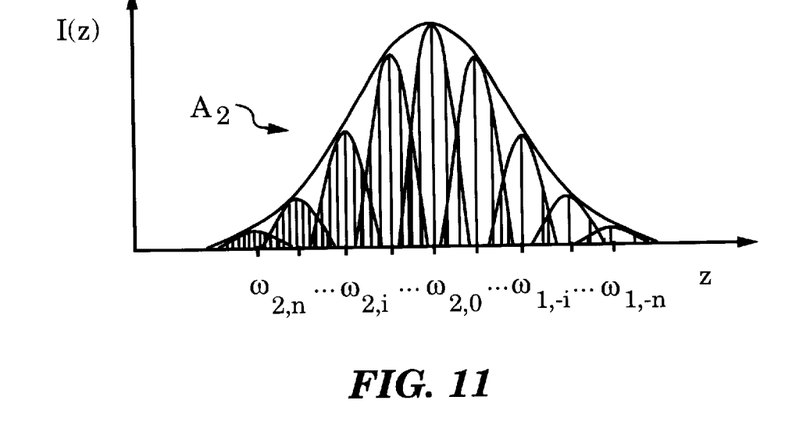
FIG. 11 is a graph showing output pulse $A_2$ with reversed chirp.

Another aspect of the invention is shown in FIG. 10. Here input pulse $A_1$ has a gaussian envelope 60 and a decreasing chirp. A nonlinear medium 62 has a grating 64 calculated in accordance with the theory of invention such that angular frequency components $\omega_{1,i}$ are converted as shown into output components $\omega_{2,i}$. Output pulse $A_2$ derived from medium 62 is shown in FIG. 11 and has an increasing chirp. In other words, the order of output frequency components $\omega_{2,i}$ is from lowest to highest frequency (left to right).

Figure 12:
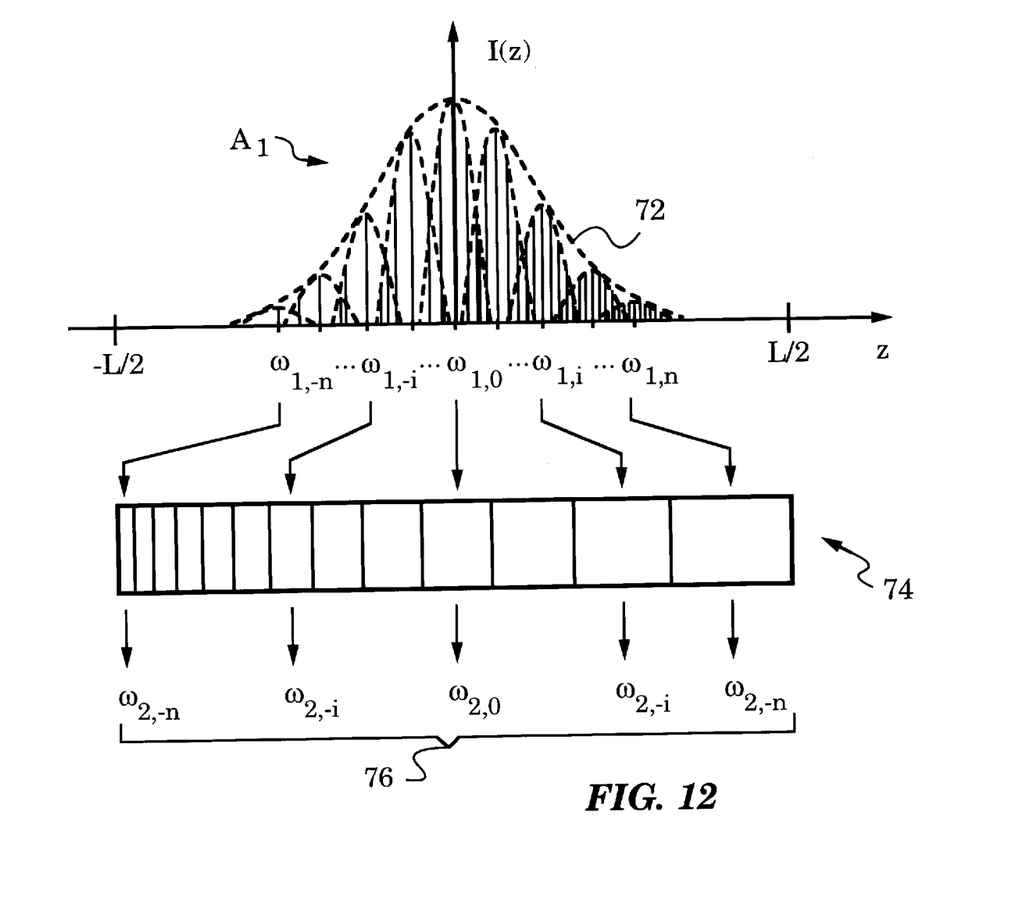
FIG. 12 is a diagram illustrating pulse stretching and chirp modification.
Figure 13:
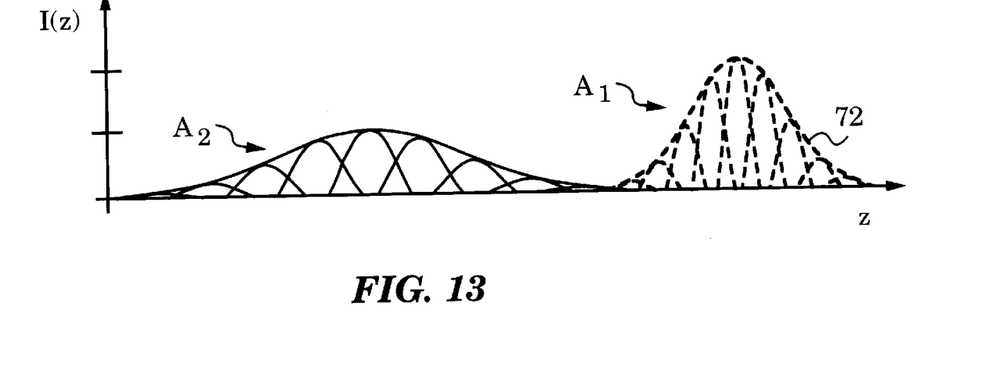
FIG. 13 is a graph showing stretched output pulse $A_2$.

Still another useful operation on input pulse $A_1$ having a gaussian envelope 72 and decreasing chirp is performed by grating 76 of medium 74 as shown in FIG. 12. Grating 76 corresponds to a specific transfer function $\hat{D}(\Omega)$ which uses pulse $A_1$ to produce a stretched output pulse $A_2$ shown in FIG. 13. This output pulse $A_2$ has a modified chirp in comparison to the chirp of input pulse $A_1$. In particular, the chirp of output pulse $A_2$ is modified such that the envelope of output pulse $A_2$ is stretched out.

Clearly, transfer function $\hat{D}(\Omega)$ can be engineered to reverse, modify or eliminate the chirp of input pulse $A_1$ in output pulse $A_2$. This, of course, will act to alter the shape of the envelop of pulse $A_2$. It is also possible to develop a transfer function $\hat{D}(\Omega)$ to produce chirp in output pulse $A_2$ when input pulse $A_1$ has no chirp.

Figure 14:
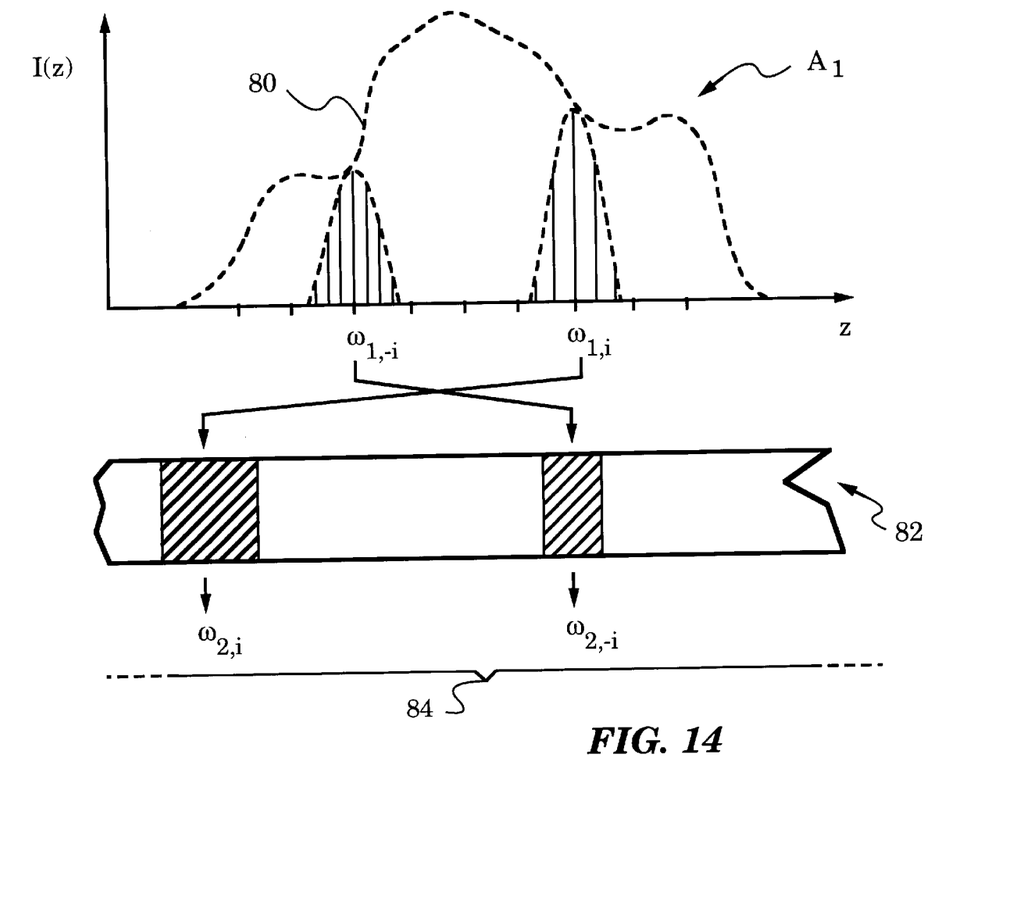
FIG. 14 is a diagram illustrating the engineering of transfer function $\hat{D}(\Omega)$ for a desired output pulse $A_2$.
Figure 15:
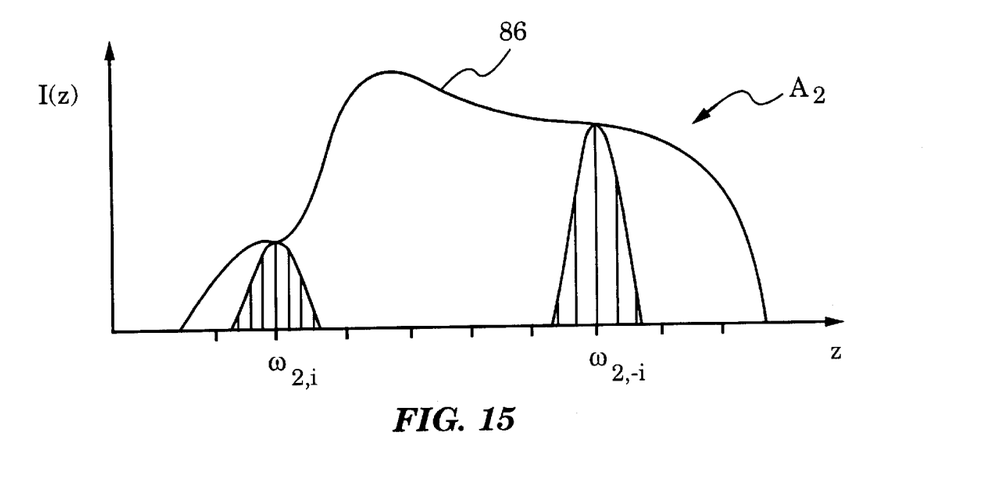
FIG. 15 is a graph showing arbitrarily engineered output pulse $A_2$.

To gain a better intuitive understanding of the mathematical generality of the invention, FIG. 14 illustrates how a specific transfer function $\hat{D}(\Omega)$ is devised and translated into a corresponding grating 84 (only portions shown) in medium 82 for an arbitrary input pulse $A_1$ having an arbitrary envelope 80 and a known chirp. In this process exact locations where given frequency components $\omega_{1,i}$, $\omega_{1,-i}$ (only two shown for clarity) will be frequency converted medium 82 are mapped out. The GVM and hence the rate of walk-off is known and taken into account to impart the desired relative delay on their corresponding components in output pulse $A_2$. The resulting output pulse $A_2$ with envelope 86 is shown in FIG. 15.

The operation of SHG of ultra-short pulses in aperiodic QPM gratings can be summarized by the example shown in FIG. 16. Shown are pulse lengths for the input fundamental frequency pulse and the output second harmonic frequency pulse plotted against the chirp of the input pulse, expressed as normalized delayed line dispersion. For an input pulse with no chirp, ($D_p=0$) the pulse length has a minimum value, $\tau_0$, determined by the bandwidth of the input pulse. For increasing (positive or negative) non-zero chirp, the input pulse length increases. The output (SH) pulse length scales qualitatively similarly as the input pulse length, but is effectively shifted such that a minimum output pulse length occurs for a non-zero value of input pulse chirp that depends on the aperiodicity of the QPM grating ($D_{g2}$). For that value of input pulse chirp the output pulse is significantly compressed relative to the input pulse. On the other hand, when the input pulse has no chirp, the output pulse is stretched relative to the input pulse.

In practice the method of the invention can be used for pre-adjustment of pulses, e.g., precompression before passage through an inherently dispersive system or post-compression after such passage. Any number of applications will be immediately apparent to one with average skill in the art.

In addition, the frequency conversion process used in the method can be sum frequency generation (SFG), difference frequency generation (DFG) or optical parametric amplification (OPA). All three are well known in the art and admit of QPM. In these cases the method of the invention is the same, but the frequency output components $\omega_{2,i}$ are not doubled but modified to a difference frequency, pump frequency or signal frequency. In fact, more than one of the three frequencies involved may be considered the useful output with controlled chirp. However, the designer should always take into account the different GVM between frequency components $\omega_{1,i}$ of input pulse $A_1$ and output components $\omega_{2,i}$ of output pulse $A_2$.

The invention is not limited to control of the chirp of optical pulses. As is clear from the arbitrary transfer function shape (which includes amplitude and phase) that can be engineered into a device with a QPM grating, one can also control the phase as well as the amplitude of the output pulse and its temporal envelope. Because of the Fourier transform relationship between the output pulse spectrum and the output pulse temporal envelope, the output pulse can be made to exhibit a controlled temporal envelope in amplitude and phase. From the previous discussion it is clear that control of the phase of the temporal envelope is equivalent to control of pulse chirp. However, control of the amplitude of the temporal envelope is equivalent to control of the pulse shape. Devices according to the invention can be designed to control chirp, pulse shape or both.

Figure 17:
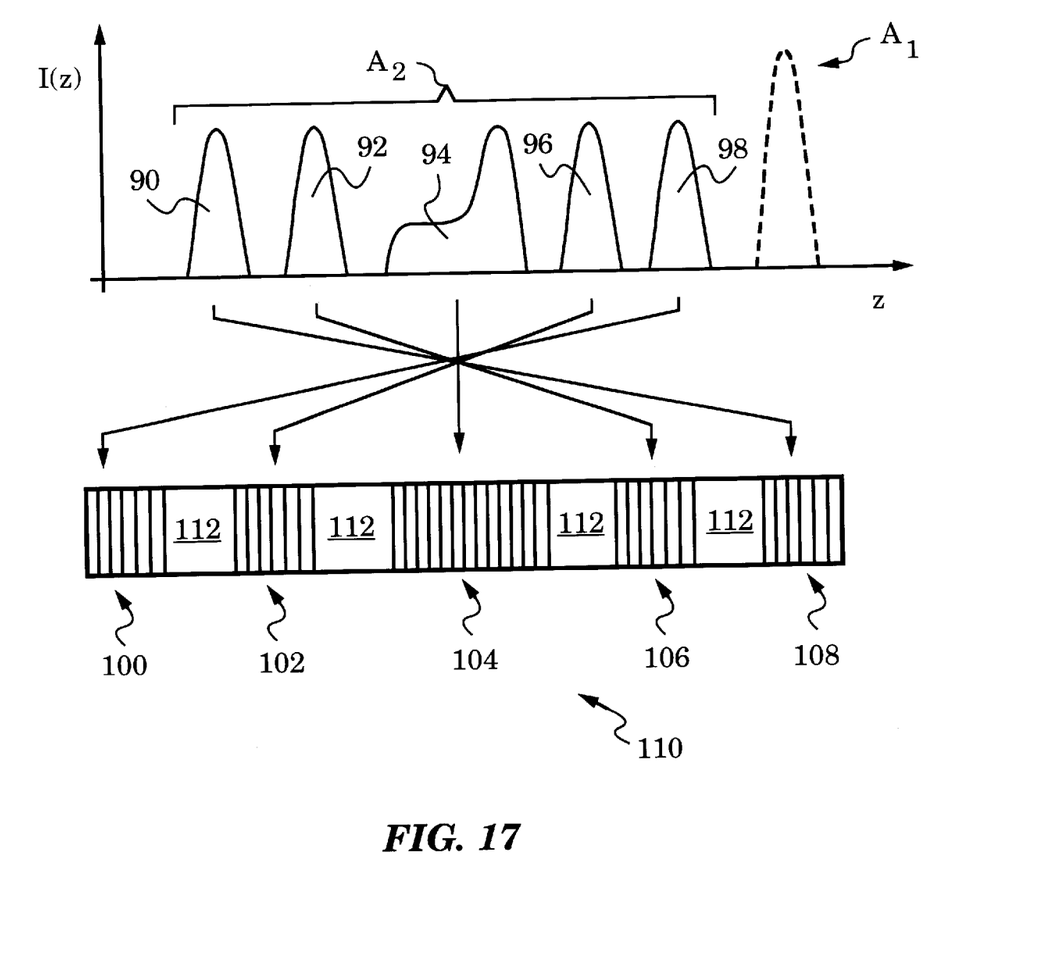
FIG. 17 is a diagram illustrating a general case of amplitude envelope control.

An example of general pulse envelope control is illustrated in FIG. 17. In this case input pulse $A_1$ is converted into output pulse $A_2$ consisting of five separate pulses 90, 92, 94, 96, 98. An apparatus 110 for chirp adjustment and frequency conversion which produces such output has a non-linear optical material with five gratings 100, 102, 104, 106, 108. The gratings are separated by regions 112 of 0% duty cycle. Regions 112 are responsible for the pauses between pulses 90, 92, 94, 96, 98 since no appreciable frequency conversion occurs at 0% duty cycle.

QPM gratings 100, 102, 106 and 108 frequency convert input pulse $A_1$ to generate pulses 90, 92, 96, 98. and perform any desired operation on the chirp of input pulse $A_1$ (details not shown). Of course, in a limiting case, gratings 100, 102, 106 and 108 may be periodic and thus not affect the chirp at all. Meanwhile, grating 104 has a varying duty cycle thus generating output pulse with the envelope shape shown.

It is clear that periodic and non-periodic portions of QPM gratings, separated by regions of 0% duty cycle, can be used to generate any arbitrary number of pulses separated by pauses as desired. This offers the designer a wide range of freedom to engineer output pulse $A_2$.

The above embodiments may be altered in many ways without departing from the scope of the invention. Accordingly, the scope of the invention should be determined by the following claims and their legal equivalents.

What is claimed is:

1. An apparatus for chirp adjustment and frequency conversion of an ultra-short input optical pulse $A_1$ having a center angular frequency $\omega_{1,0}$, said apparatus comprising:
    a) a non-linear optical material;
    b) a quasi-phasematching grating in said non-linear optical material having an aperiodic pattern of regions $D_j$ such that passing said ultra-short input optical pulse $A_1$ through said regions $D_j$ produces a chirp-adjusted and frequency-converted output optical pulse $A_2$.

2. The apparatus of claim 1 wherein said regions $D_j$ have corresponding non-linear properties defined by non-linear coefficients $d_j$ and said non-linear coefficients $d_j$ alternate between said regions $D_j$.

3. The apparatus of claim 2 wherein said non-linear coefficients $d_j$ alternate in magnitude.

4. The apparatus of claim 2 wherein said non-linear coefficients $d_j$ alternate in sign.

5. The apparatus of claim 1 wherein said non-linear optical material is a Second Harmonic Generator (SHG) and said output optical pulse $A_2$ is the second harmonic of said ultra-short input optical pulse $A_1$.

6. The apparatus of claim 5 wherein said regions $D_j$ have widths $\Lambda_j$ and corresponding non-linear properties defined by non-linear coefficients $d_j$ chosen such that the action of said regions $D_j$ is characterized by a transfer function $\hat{D}(\Omega)$, where $\Omega = \omega - \omega_{1,0}$ and $\omega$ is the angular frequency, such that:

$$\hat{A}_2(\Omega) = \hat{D}(\Omega) \cdot \widehat{A_1^2}(\Omega).$$

where $\widehat{A_1^2}(\Omega)$ is the Fourier transform of the square of said ultra-short input optical pulse $A_1$ and $\hat{A}_2(\Omega)$ is the Fourier transform of said output optical pulse $A_2$.

7. The apparatus of claim 6 wherein said ultra-short input optical pulse $A_1$ has input angular frequency components $\omega_{1,i}$ including said center angular frequency $\omega_{1,0}$, and said widths $\Lambda_j$ are selected such that predetermined groups of said regions $D_j$ act on each of said angular frequency components $\omega_{1,i}$ to generate corresponding output angular frequency components $\omega_{2,i}$ making up said output optical pulse $A_2$.

8. The apparatus of claim 6 wherein said regions $D_j$ are arranged in groups in order of increasing width of said widths $\Lambda_j$.

9. The apparatus of claim 6 wherein said regions $D_j$ are arranged in groups in order of decreasing width of said widths $\Lambda_j$.

10. The apparatus of claim 6 wherein said regions $D_j$ are arranged in groups in a predetermined order to produce a specific transfer function $\hat{D}(\Omega)$.

11. The apparatus of claim 1 wherein said aperiodic pattern is an aperiodically poled pattern and said regions $D_j$ have corresponding widths $\Lambda_j$.

12. The apparatus of claim 11 wherein said regions $D_j$ are arranged in groups in order of increasing width of said widths $\Lambda_j$.

13. The apparatus of claim 11 wherein said regions $D_j$ are arranged in groups in order of decreasing width of said widths $\Lambda_j$.

14. A method for chirp adjustment and frequency conversion of an ultra-short input optical pulse $A_1$ having a center angular frequency $\omega_{1,0}$, said method comprising the following steps:
    a) providing a non-linear optical material with a quasi-phasematching grating having an aperiodic pattern of regions $D_j$;
    b) passing said ultra-short input optical pulse $A_1$ through said regions $D_j$ to produce a chirp-adjusted and frequency-converted output optical pulse $A_2$.

15. The method of claim 14 wherein said non-linear optical material is a Second Harmonic Generator (SHG) and said output optical pulse $A_2$ is the second harmonic of said ultra-short input optical pulse $A_1$.

16. The method of claim 15 wherein said regions $D_j$ have widths $\Lambda_j$ and corresponding non-linear properties defined by non-linear coefficients $d_j$ chosen such that the action of said regions $D_j$ is characterized by a transfer function $\hat{D}(\Omega)$, where $\Omega = \omega - \omega_{1,0}$ and $\omega$ is the angular frequency, such that:

$$\hat{A}_2(\Omega) = \hat{D}(\Omega) \cdot \widehat{A_1^2}(\Omega),$$

where $\widehat{A_1^2}(\Omega)$ is the Fourier transform of the square of said ultra-short input optical pulse $A_1$ and $\hat{A}_2(\Omega)$ is the Fourier transform of said output optical pulse $A_2$.

17. The method of claim 16 wherein said ultra-short input optical pulse $A_1$ has input angular frequency components $\omega_{1,i}$ including said center angular frequency $\omega_{1,0}$, and said method comprises selecting said widths $\Lambda_j$ such that predetermined groups of said regions $D_j$ act on each of said angular frequency components $\omega_{1,i}$ to generate corresponding output angular frequency components $\omega_{2,i}$ making up said output optical pulse $A_2$.

18. The method of claim 16 wherein said regions $D_j$ are arranged in such an order that said output optical pulse $A_2$ has no chirp when said input optical pulse $A_1$ has chirp.

19. The method of claim 16 wherein said regions $D_j$ are arranged in a such an order that said output optical pulse $A_2$ has chirp when said input optical pulse $A_1$ has no chirp.

20. The method of claim 16 wherein said regions $D_j$ are arranged in a such an order that said output optical pulse $A_2$ has a modified chirp in comparison to the chirp of said input optical pulse $A_1$.

21. The method of claim 20 wherein said modified chirp is altered in magnitude.

22. The method of claim 20 wherein said modified chirp is altered in direction.

23. The method of claim 16 wherein said regions $D_j$ are arranged in such an order that said output optical pulse $A_2$ is compressed.

24. The method of claim 16 wherein said regions $D_j$ are arranged in such an order that said output optical pulse $A_2$ is stretched.

25. The method of claim 16 wherein said regions $D_j$ are arranged according to the chirp of said ultra-short input optical pulse $A_1$.

26. The method of claim 16 wherein said regions $D_j$ are arranged such that the chirp of said ultra-short input optical pulse $A_1$ is reversed.

* * * * *